Patented Dec. 2, 1947

2,431,909

UNITED STATES PATENT OFFICE 2,431,909

SULFONYL DINAPHTHYLMETHANES

Elkan R. Blout, Cambridge, and Richard S. Corley, Boston, Mass., assignors to Polaroid Corporation, Cambridge, Mass., a corporation of Delaware No Drawing. Application September 9, 1946, Serial No. 695,818

1 Claim. (Cl. 260—556)

This invention relates to organic chemical compounds and is directed to a new dinaphthylmethane.

By this invention there is provided a new compound namely N-benzenesulfonyl-2-amino-2'-methoxy-1,1'-dinaphthylmethane which may be represented by the formula

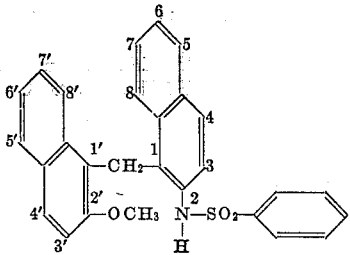

N-benzenesulfonyl - 2 -amino-2'-methoxy-1,1'-dinaphthylmethane represented above as a pure compound may take the form of colorless refractive thick hexagonal plates exhibiting a melting point of about 147°–148° C. The new compound is readily soluble in a 2% sodium hydroxide solution in a mixture of approximately equal parts of water and ethanol. The compound is readily soluble in pyridine, moderately soluble in hot n-butanol and difficultly soluble in ethanol and in ether.

N-benzenesulfonyl - 2 -amino-2'-methoxy-1,1'-dinaphthylmethane may be prepared by the reaction of 2-amino-2'-methoxy-1,1'-dinaphthylmethane which is disclosed and claimed in copending application Serial No. 695,816 filed on even date herewith.

EXAMPLE 1

N-benzenesulfonyl - 2 -amino-2'-methoxy-1,1'-dinaphthylmethane may be prepared as follows:

0.5 gram of 2-amino-2'-methoxy-1,1'-dinaphthylmethane was dissolved in 5 cc. of pyridine, and 0.21 cc. of freshly distilled benzenesulfonyl chloride was added. The orange-brown solution was warmed for 15 minutes on a steam bath and was then diluted with 20 cc. of water, and a thick orange gum was precipitated. This gum was washed by trituration twice with water, twice with dilute hydrochloric acid and again twice with water. The material was then crystallized from a mixture of acetone and hexane to produce in two crops 0.43 gram of colorless blocky prisms of N-benzenesulfonyl-2-amino-2'-methoxy-1,1'-dinaphthylmethane exhibiting a melting point of about 144°–147° C.

For purposes of analysis N-benzenesulfonyl-2-amino-2'-methoxy-1,1'-dinaphthylmethane prepared as above was crystallized four times from a mixture of acetone and hexane and was dried at 80° C. and a pressure of one millimeter of mercury. The product was pure N-benzenesulfonyl-2-amino-2'-methoxy-1,1'-dinaphthylmethane in the form of colorless refractive thick hexagonal plates exhibiting a melting point of about 147°–148° C.

Upon rapid crystallization radial clusters of elongated prisms were formed.

Microanalysis of the pure N-benzenesulfonyl-2-amino - 2'- methoxy - 1,1'- dinaphthylmethane which has the empirical formula $C_{28}H_{23}NO_3S$ has shown the presence of 74.51% carbon and 5.31% hydrogen as compared with the calculated values of 78.15% carbon and 5.11% hydrogen.

Preparation of 2-amino-2'-methoxy-1,1'-dinaphthylmethane 10 grams (0.07 mole) each of beta-naphthol and beta-naphthylamine (purified by vacuum distillation and crystallization from benzene-hexane) and 2.3 grams of paraformaldehyde (0.07 mole) were boiled for 15 minutes in 150 cc. of benzene in a flask provided with a "take-off" reflux condenser. During this time about 2 cc. of water and about 50 cc. of benzene were removed by azeotropic distillation. The clear brownish-yellow solution upon cooling and standing for 12 hours deposited 10.8 grams of colorless fibrous needles of 2-amino-2'-hydroxy-1,1'-dinaphthylmethane. The needles were washed by suspension in about 25 cc. of hot benzene. The product exhibited a melting point of about 195°–196° C. with decomposition. The compound 2-amino-2'-hydroxy-1,1'-dinaphthylmethane is disclosed and claimed in copending application Serial No. 695,814 filed on even date herewith.

To a solution of 3 grams (0.01 mole) of 2-amino-2'-hydroxy-1,1'-dinaphthylmethane in 60 cc. of boiling acetone was added 0.95 cc. of acetic anhydride (1.02 grams, 0.01 mole). The solution was permitted to boil slowly on a steam bath for about 15 minutes. Toward the end of this period 5 to 10 cc. of ethanol were added to provide a total volume of about 30 cc. At this time the product began to crystallize out. On cooling 3.16 grams of colorless sparkling blocks of N-acetyl-2-amino-2'-methoxy-1,1'-dinaphthylmethane were collected. This compound is disclosed and claimed in copending application Serial No. 695,817 filed on even date herewith.

10 grams of N-acetyl-2-amino-2'-methoxy-1,1'-dinaphthylmethane (0.0295 mole) were dissolved quickly by warming in 150 cc. of methanol with 2 grams of potassium hydroxide. 7 cc. of freshly distilled dimethyl sulfate were then added in small portions. The solution was maintained basic by the addition of a 10% aqueous solution of sodium hydroxide. After warming 10 minutes more on a steam bath 15 cc. of water were added. Soon a copious white precipitate came out of the solution. The mixture was kept warm for another period of 10 minutes and then cooled. The precipitated product was then collected, washed and dried. The yield was 9.50 grams of a colorless crystalline powder of nearly pure N-acetyl-2-amino-2'-methoxy-1,1'-dinapthylmethane exhibiting a melting point of about 214°–216° C. This compound is disclosed and claimed in copending application Serial No. 695,817 filed on even date herewith.

1.5 grams of N-acetyl-2-amino-2'-methoxy-1,1'-dinaphthylmethane were refluxed for 30 hours in 75 cc. of a concentrated solution of potassium hydroxide in n-butanol (about 5%) together with 2 cc. of water. Upon cooling the solution 2-amino-2'-methoxy-1,1'-dinaphthylmethane separated out as radial clumps of needles which soon filled the flask. This material was cooled, washed with a small quantity of methanol and then water, and dried. The product was 0.80 gram of colorless silky needles of 2-amino-2'-methoxy-1,1'-dinaphthylmethane which exhibited a melting point of about 132°–134° C. This compound is disclosed and claimed in copending application Serial No. 695,816 filed on even date herewith.

Since certain changes may be made in the above subject matter without departing from the scope of the invention herein involved, it is intended that all matter contained in the above description shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

What is claimed is:

N - benzenesulfonyl-2-amino-2'-methoxy-1,1'-dinaphthylmethane represented by the following formula:

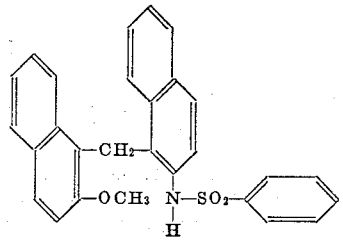

and which in the form of colorless refractive thick hexagonal plates exhibits a melting point of about 147°–148° C.

ELKAN R. BLOUT.
RICHARD S. CORLEY.